United States Patent
Nam et al.

(10) Patent No.: US 8,811,179 B2
(45) Date of Patent: Aug. 19, 2014

(54) METHOD AND APPARATUS FOR CONTROLLING PACKET FLOW IN A PACKET-SWITCHED NETWORK

(75) Inventors: Scott K. Nam, Glendale, CA (US); Jonathan B. Wong, Alhambra, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/597,905

(22) Filed: Aug. 29, 2012

(65) Prior Publication Data

US 2012/0320747 A1    Dec. 20, 2012

Related U.S. Application Data

(62) Division of application No. 12/459,252, filed on Jun. 29, 2009, now Pat. No. 8,284,666.

(51) Int. Cl.
*H04L 12/26* (2006.01)

(52) U.S. Cl.
USPC .......................................................... 370/235

(58) Field of Classification Search
USPC ....................................... 370/235, 389, 395.4
See application file for complete search history.

(56) References Cited

U.S. PATENT DOCUMENTS

| | | | |
|---|---|---|---|
| 7,116,672 B1 * | 10/2006 | Sivakumar | 370/395.4 |
| 7,149,214 B2 * | 12/2006 | Wu et al. | 370/389 |
| 2007/0064700 A1 * | 3/2007 | Holness | 370/392 |
| 2010/0146599 A1 * | 6/2010 | Padmanabha et al. | 726/5 |
| 2010/0329115 A1 | 12/2010 | Nam et al. | |
| 2012/0002553 A1 * | 1/2012 | Olson et al. | 370/241 |

\* cited by examiner

*Primary Examiner* — Albert T Chou
(74) *Attorney, Agent, or Firm* — Hitt Gaines, PC

(57) ABSTRACT

The disclosure provides an authentication network. In one embodiment the authentication network includes: (1) an authentication server for receiving authentication requests, (2) at least one network node for forwarding authentication requests from user devices to the authentication server, and (3) a flooding disabler in the at least one network node for selectively disabling the flooding of packets from the user device by the at least one network node.

5 Claims, 12 Drawing Sheets

METHOD AND APPARATUS FOR CONTROLLING PACKET FLOW IN A PACKET-SWITCHED NETWORK

CROSS-REFERENCE TO RELATED APPLICATIONS

This Application is a Divisional of U.S. application Ser. No. 12/459,252 filed on Jun. 29, 2009 now U.S. Pat. No. 8,284,666, to Nam, et al., entitled "Method and Apparatus for Controlling Packet Flow in a Packet-Switched Network," which is currently allowed, commonly assigned with the present invention and incorporated herein by reference.

TECHNICAL FIELD

The disclosure relates generally to the field of communication networks, and, more particularly, to controlling the flooding of packets on multiple ports of a network node.

BACKGROUND

The following abbreviations are herewith defined, at least some of which are referred to within the following description of the state-of-the-art and the present invention.
CPU Central Processing Unit
IEEE Institute of Electrical and Electronics Engineers
ITU International Telecommunication Union
LAN Local Area Network
L2 Lyer 2 (a reference to the OSI reference model for networks)
MAC Media Access Control
MAN Metropolitan Area Network
OSI Open Systems Interconnection (initiative)
VLAN Virtual Local Area Network
WAN Wide Area Network Computers are often connected together through a network so that data may be exchanged between them and computing resources may be shared. Two computers may be directly connected, of course, but more typically a network is made formed of many interconnected nodes. Such networks are often classified as, for example, LANs, MANs, and WANs according to their size and function. A network may be connected with one or more other network. The network nodes, such as bridges, switches, or routers, are generally not data destinations themselves, but simply receive data and forward it toward its intended destination. This packet routing is typically done according to a set of standard protocols such as the Ethernet protocol described in a standard referred to as IEEE 802.3 and in various related protocols.

In a packet-switched network, the data in one computing device is may be divided into a great many discrete segments, often called packets, that are individually addressed and transmitted toward their destination. The packets may take different routes from origin to destination, but are provided with identifying information and sequentially numbered so that they may be reassembled in their proper order. The identifying information also includes the identity of the source and the intended destination of the packets.

The rules for packet routing according to Ethernet or similar standards are numerous, but one example will be described with reference to FIGS. 1 and 2 as background for describing the present invention.

FIG. 1 is a simplified schematic diagram illustrating selected components of a typical network 100. In network 100, there is shown a single server 110 and a single network node 101, which may for example be a switch or a router. Server 110 is in direct communication with node 101, a connection having been established between port 112 of server 110 and port 102 of node 101. Note that while a direct physical connection, such as a wire or optical fiber, is illustrated in FIG. 1, the presence of an intermediate device such as a repeater or hub is not precluded. In network 100, client 120 is in direct communication with node 101, with port 121 of client 120 connected to port 103 of node 101. Similarly, clients 130, 140, and 150 are also in direct communication, with ports 122, 123, and 124 being connected, respectively, to ports 104, 105, and 106 of node 101.

As might be expected, many actual networks include a larger number of interconnected nodes and enable data communication between many servers and clients. In addition, communication between each client and server, or between two or more peer devices, may actually travel through multiple network nodes before reaching its destination. In any case, the network node 101 is capable of receiving a data packet transmission from a source (or intermediate node) on one port, examining the packets to determine their intended destination, and forwarding the packets toward it. FIGS. 1 and 2 illustrate briefly how this is done in a typical network.

Each data packet will include header information indicating the address, for example the MAC address of the source and the intended destination, each address being associated with a unique hardware device. In an Ethernet network, a layer 2 (L2) hardware lookup table (not shown in FIG. 1) in node 101 is used to keep track of routing information associated with various addresses encountered by the node. In the example of FIG. 1 it is assumed that a L2 hardware lookup table of node 101 associates the client 120 with port 103 of node As a result, when packets (as indicated by the arrows in FIG. 1) arrive on port 102 of node 101 and indicate that they are intended for delivery to client 120, then node 101 forwards the packets on port 103. Note that port 103 could be associated with client 120 even if port 121 of client 120 were not in direct communication with port 103, although that is not the case in the example of FIG. 1. Note also that when the packets from server 110 are received at node 101, an entry may be made in the L2 hardware lookup tables of node 101 associating server 110 with port 102. If and when packets are received in node 101 destined for server 110, they can be forwarded on port 102.

If network node 101 has not learned to associate a particular port with an intended destination, then the received packets are typically flooded on all ports (except the port on which they were received). FIG. 2 is the simplified schematic diagram of FIG. 1, illustrating the broadcasting, or flooding, of packets when the route to the intended recipient is unknown to the network node 101. In this example a failure in the direct communication link between port 103 of node 101 and port 121 of client 120 is indicated. In operation, the node 101 and client 120 regularly communicate with each other to confirm the integrity of this communication link. A failure to receive these regular communications in node 101 indicates that client device 120 is no longer available on port 103, and the entry associating them in the L2 hardware lookup table is removed.

In this case, when packets intended for client 120 are received at port 102 of node 101, they are flooded, or broadcast to all ports except the port 102 on which they were received. (In this example, they are also not sent on port 103, as a failure of that link has been perceived.) As illustrated in FIG. 2, this includes forwarding packets on ports 104, 105, and 106. As should be apparent, the packets will in this scenario not reach their intended destination, client 120, but they will be received at clients 130, 140, and 150. This raises a network security risk. While in most instances clients 130, 140, and 150 will simply discard then packets when they determine they are not be intended destination, a malicious recipient may instead process them to learn the information that was intended for client 120. The flooding, though which the packets will not reach their intended destination due to the link failure, also unnecessarily consumes network resources.

In some networks, the flooding of packets may be limited by instituting one or more VLANs, and associating only certain ports on node 101 with each VLAN. When packets received at node 101 include a VLAN identifier, if the destination address is not associated with a particular port on the L2 hardware lookup table, flooding is nevertheless limited to ports associated with the identified VLAN. While utilizing VLANs does reduce the security risk associated with flooding the packets to all ports, and the unnecessary consumption of network resources, it does not fully eliminate these concerns. Another solution, at least to the security concerns, is encrypting the packets that are sent from the server 110 to client 120. Again, however, this does not eliminate the security risk entirely. A malicious user with an adversary device that receives flooded packets may attempt to secure the keys needed for decryption.

Needed, then, is a manner of controlling the flooding of packets in packet-switched networks when the destination address of packets received at a network node cannot be associated with a particular port by the node at which they were received.

SUMMARY

In one aspect, the disclosure provides an authentication network. In one embodiment the authentication network includes: (1) an authentication server for receiving authentication requests, (2) at least one network node for forwarding authentication requests from user devices to the authentication server, and (3) a flooding disabler in the at least one network node for selectively disabling the flooding of packets from the user device by the at least one network node.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The disclosure is directed to a manner of controlling data packet flooding in a data-communication network to promote network security and provide for more efficient utilization of network resources. The disclosure provides an authentication network that includes a node and a flooding disabler. In one embodiment, the node may be, for example, a switch or router in an Ethernet network. In this case, the flooding disabler may be a disable bit set in an L2 hardware lookup table and associated with a particular device such that, when set, the flooding of packets received in the node from the associated device are not flooded. The flooding disabler may be set in response to a communication from the authentication server, for example a response to an authentication request. The device associated with the flooding disable may in that case be the user device that submitted the authentication request. A first embodiment of the disclosure will now be illustrated with reference to FIGS. 3 through 7.

Figure 1:
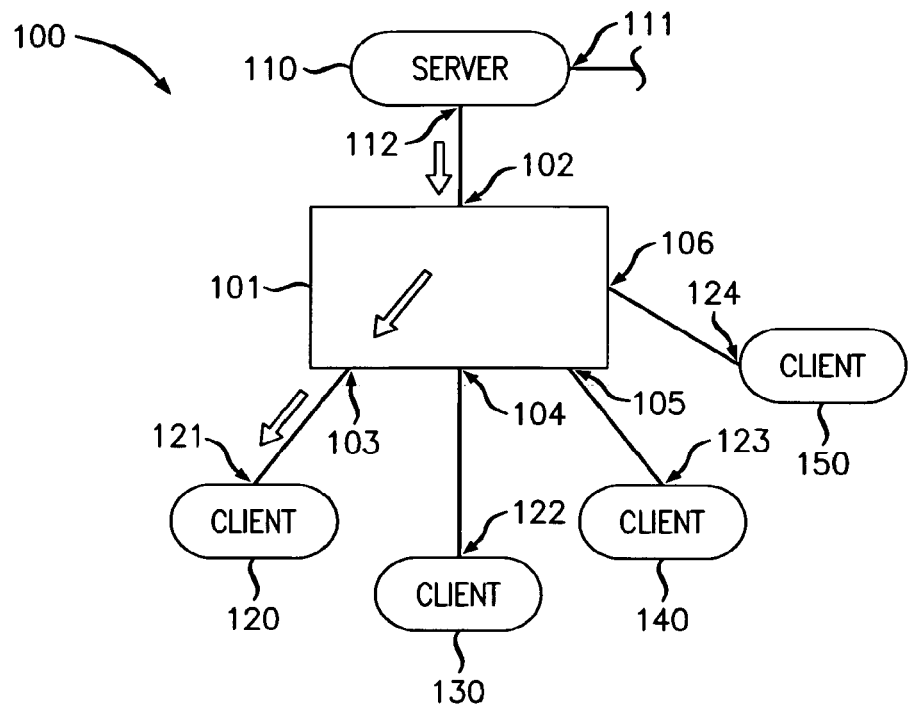
FIG. 1 is a simplified schematic diagram illustrating selected components of a typical packet-switched network.
Figure 2:
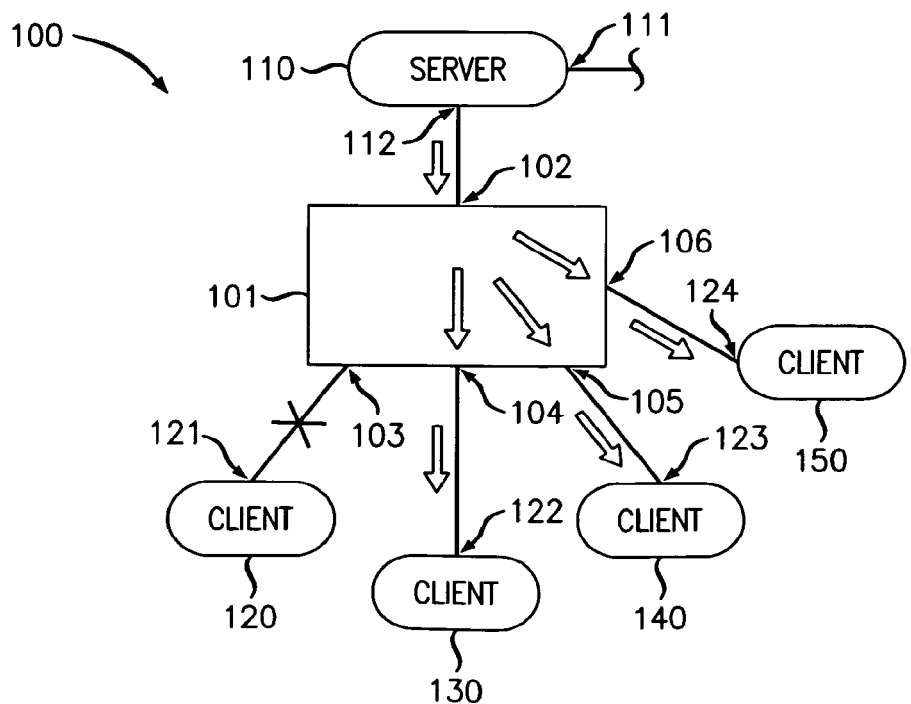
FIG. 2 is the simplified schematic diagram of FIG. 1, illustrating the broadcasting, or flooding, of packets when the route to the intended recipient is unknown to a network node.
Figure 3:
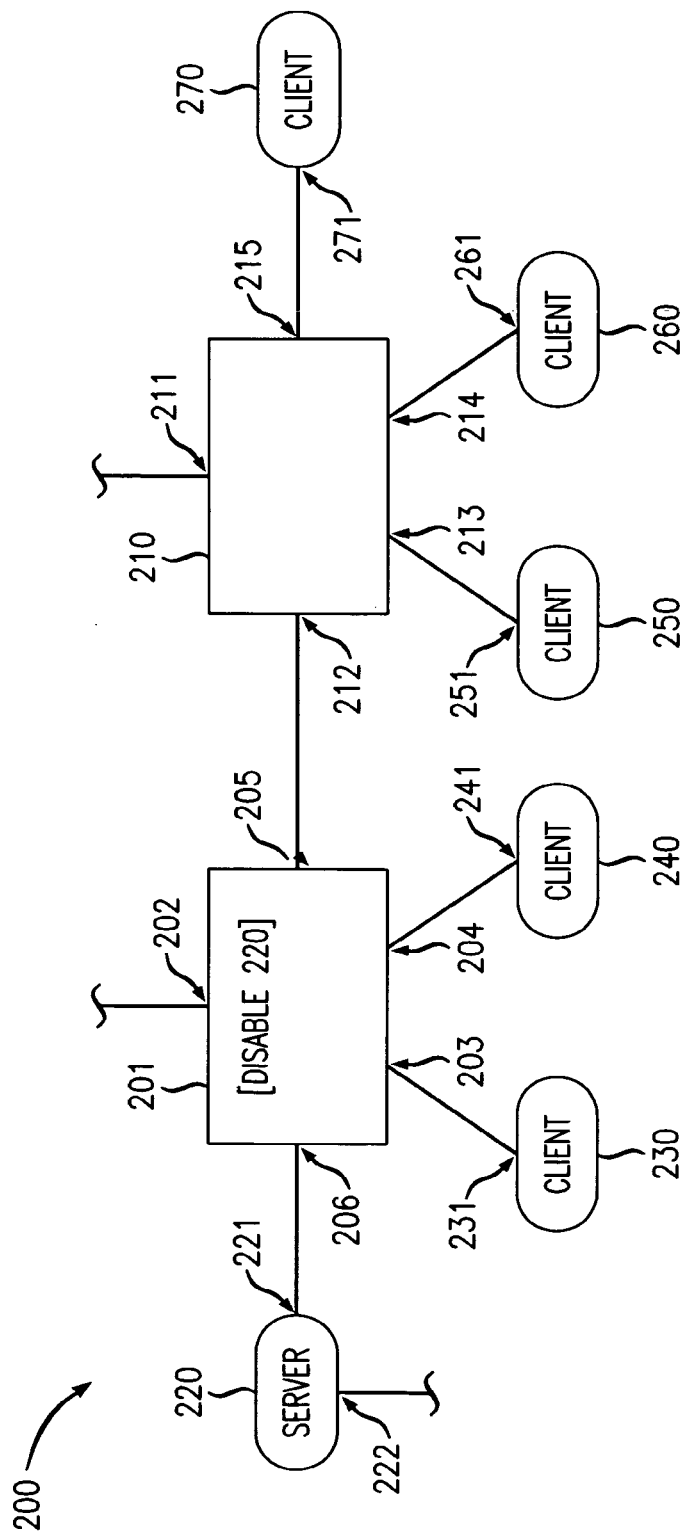
FIG. 3 is a simplified schematic diagram illustrating selected components of a packet-switched network according to an embodiment of the present invention.

FIG. 3 is a simplified schematic diagram illustrating selected components of a packet-switched network 200 according to an embodiment of the disclosure. Here again, as with FIGS. 1 and 2, a number of client devices are in communication with a server via a packet-switched network. In the network 200 of FIG. 3, server 220 is in direct communication with node 201 via a connection from port 221 of server 220 to port 206 of node 201. Server 221 may also be connected to other devices, as represented by the line extending from port 222, but this is not necessarily the case. Port 205 of node 201 is connected to port 212 of node 210. Nodes 201 and 210 may, for example, be switches or routers and may be connected to other devices, as represented by their respective ports 202 and 211. Network 200 may be, for example, an Ethernet network operating according to IEEE 802.3 and related protocols.

In the embodiment of FIG. 3, client devices 230 and 240 are each in direct communication with node 201 via connections from port 203 to port 231 and port 204 to port 241, respectively. Similarly, clients 250, 260, and 270 are in direct communication with node 210. In one implementation, the server may be operated by a bank or other financial institution, and the client devices personal computers owned by bank customers. Security in data communication is very important in this implementation, and an adversarial attack attempting to steal customer information or execute fraudulent transactions. In another example, the server may be associated with a health care provider and client devices with patients.

Note that the client-server environment is not a requirement for implementation of the present invention. As will be apparent, however, the present invention may be advantageously implemented in such an environment. Importantly in this regard, it should be noted that each of the client devices shown in FIG. 3 is not necessarily an actual (for example) bank customer or health-care patient. One or more the client devices may actually be adversarial, and waiting to discover confidential information when it has the opportunity.

In an attempt to frustrate adversary devices, in the embodiment of FIG. 3, node 201 is set to disable flooding for packets whose source address indicate they are from server 220. The may be done in several different ways, for example server 220 may send a communication to node 201 (or to all neighbor nodes) for this purpose. In this case, the communication allows node 202 learn that server 221 is associated with port 206. In an Ethernet, this association may be stored in a L2 hardware lookup table for future reference. In accordance with this embodiment of the disclosure, node 201 also associates a flooding disable bit in the L2 hardware lookup table with server 220. As a result, packets indicating their source address to be server 220 are not flooded to all ports, or to all ports within an indicated VLAN, even if their intended destination cannot be associated with a known port on node 201.

Figure 4:
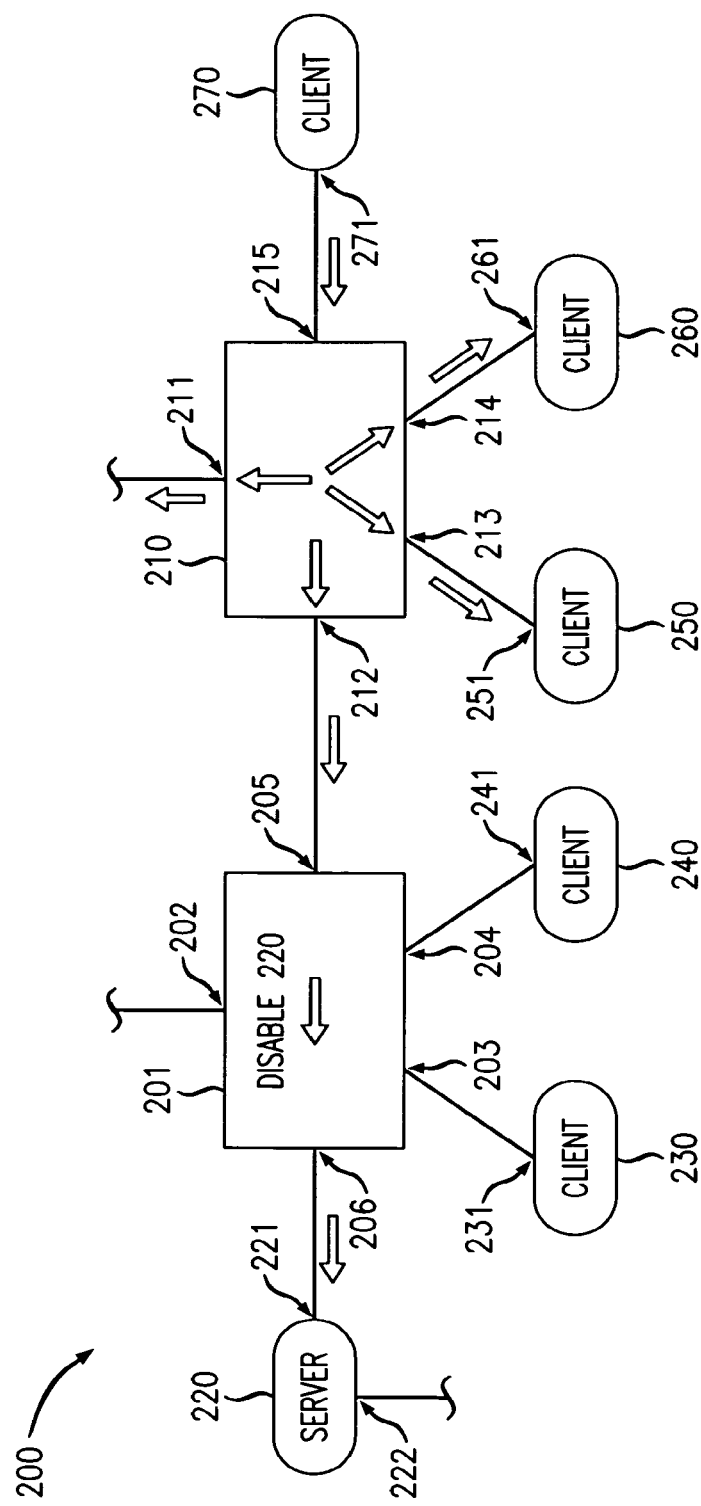
FIG. 4 indicates an exemplary initiation packet flow in the network of FIGS. 3 through 7 in accordance with an embodiment of the present invention.

Operation of the present invention according to this embodiment will now be described. In many client-server communications, it is the client that initiates a communication session. FIG. 4 indicates an exemplary initiation packet flow in the network 200 of FIGS. 3 through 7 in accordance with an embodiment of the disclosure. As indicated by the arrow from port 271 of client 270 to port 215 of node 210, packets initiating a communication session between client 270 and server 220 are first received in node 210, which determines the address of their intended destination. Node 210, of course, also determines the source address of the packets and in this way learns to associate port 215 with client 270.

In this embodiment, however, node 211 has not learned which port, if any, to associate with server 220 and therefore floods the packets on all ports. Note that in this embodiment, there is no VLAN indicated that limits the ports on which flooding will take place. Note that as used herein "flooding" means broadcasting on all ports, generally omitting the port on which the packets were received. "All ports" in this context does not imply that the flooded packets are necessarily forwarded on the receiving port, an in addition is limited to ports that are not excluded for some other reason, for example as not being associated with an identified VLAN.

When the clients 250 and 260 receive these packets they will determine they are not the intended destination and simply discard them. Unless, perhaps, they are in fact adversarial devices attempting to capture traffic not intended for them.) The same is true for any such device downstream from port 211, although it is possible that the packets will be forwarded as a unicast or flooded by another switch prior to reaching a device that discards them. While the security implications discussed earlier may also be an issue at this point, it is reasonable to presume that in most cases the initial packet flow often does not contain any information that may compromise either the client 270 or the server 220 even if received at an adversary device. In any event flooding is necessary in some cases, despite this risk, in order to establish communication sessions between certain devices.

In the embodiment of FIG. 4, flooding the packets on all ports of node 210 results in their being forwarded on port 212 and being received at port 205 of node 201. Node 201 examines the source address of the packets and learns to associate client 270 with port 205. Node 201 also determines the destination address for the packets to be server 220. If node 201 was unable to associate the server 220 with one of its ports, it would flood the packets on all ports, or all ports associated with an identified VLAN, if any. In this embodiment, however, node 201 has already learned to associate server 220 with port 206, and therefore forwards the packets on port 206. The packets are then received at port 221 of server 220, their intended destination.

Figure 5:
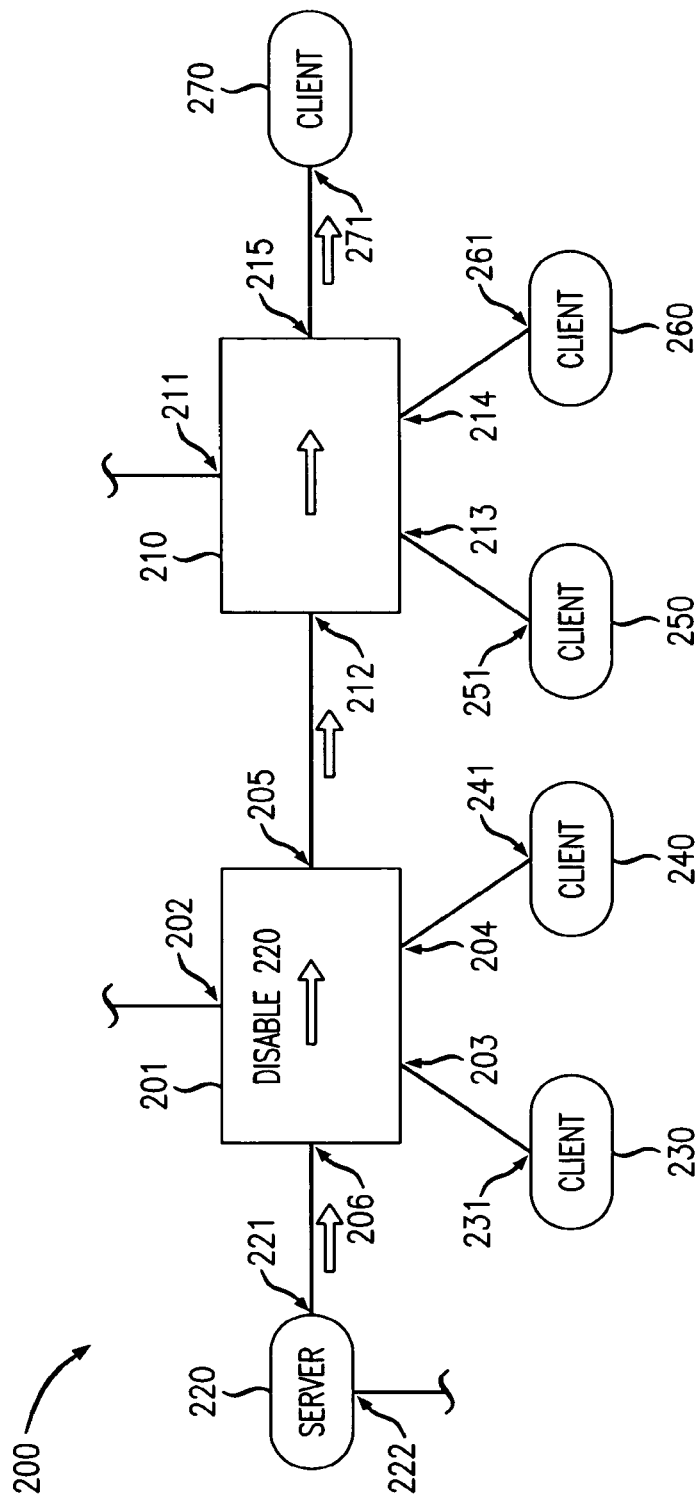
FIG. 5 indicates an exemplary return packet flow in the network of FIGS. 3 through 7 in accordance with an embodiment of the present invention.

FIG. 5 indicates an exemplary return packet flow in the network 200 of FIGS. 3 through 7 in accordance with an embodiment of the disclosure. In this embodiment, the server 220 is responding to the client 270, either as part of a communication session initiated earlier or, possibly, to initiate a new communication session. The packets sent from server 220 on port 221 are received at port 206 of node 201. Node 201 determines the destination address of the received packets to be client 270. Since node 201 has previously learned to associate its port 205 with client 270, it forwards the packets on port 205.

The packets forwarded on port 205 are received on port 212 of node 210, and a similar process occurs. Node 210 determines the destination address of the received packets to be client 270. Since node 210 has previously learned to associate its port 215 with client 270, it forwards the packets on port 215. The forwarded packets are then received at port 271 of client 270, their intended destination. Communications between client 270 and server 220 may then proceed in a like manner until a change in the configuration of network 200 occurs. A change in configuration may occur intentionally result from the failure of a network node or interconnecting link.

Figure 6:
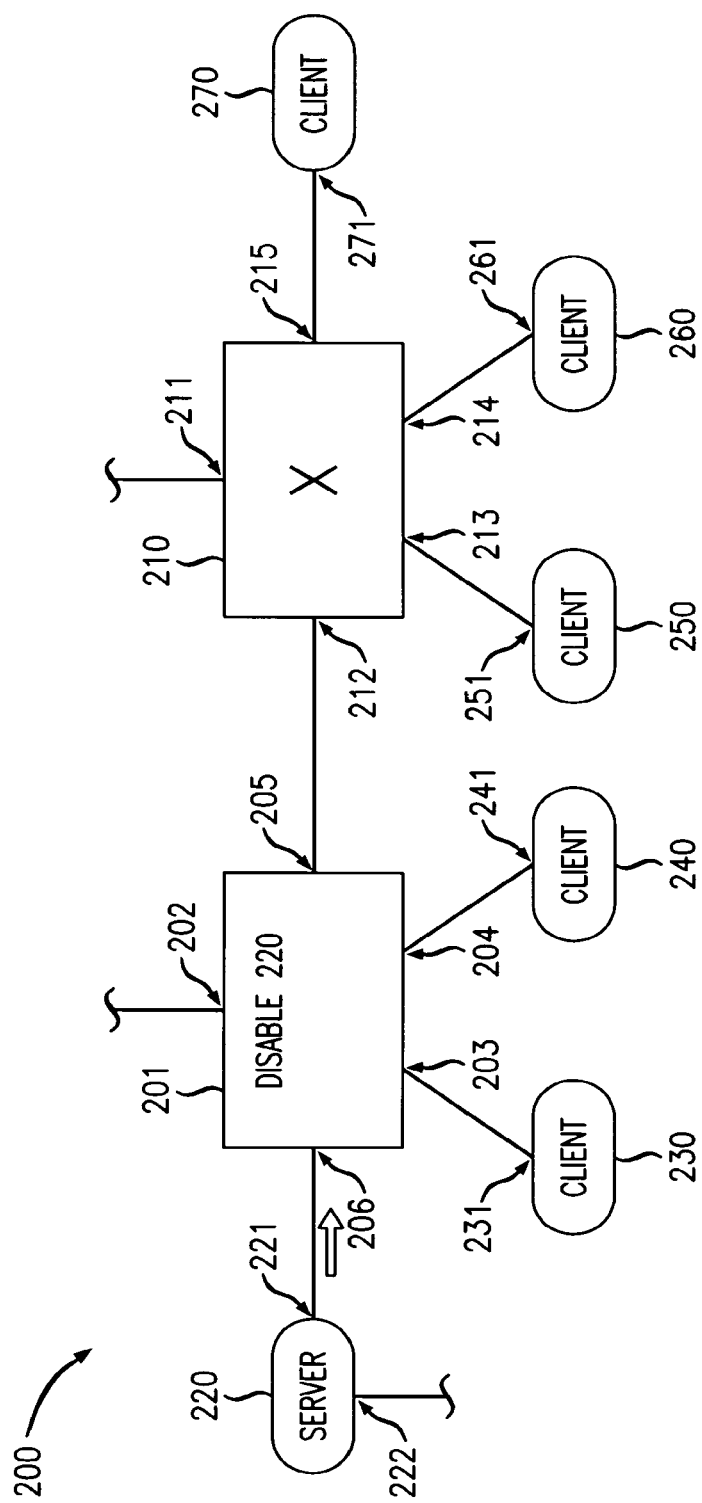
FIG. 6 illustrates a response to an exemplary failure in the network of FIGS. 3 through 7 according to an embodiment of the present invention.

FIG. 6 illustrates a response to one such failure in network 200 according to an embodiment of the disclosure. In this embodiment, the failure occurs in node 210, which for some reason no longer functions normally. Since the node 201 and the node 210 regularly communicate to confirm the connection between them, node 201 learns that node 210 has failed. At this point, it also deletes any associations involving port 205, including the association between port 205 and client 270. As a consequence, when packets are received in node 201 on port 206 and the destination address is determined to be client 270, node 201 determines that there is no port associated with this destination. In accordance with the disclosure, however, node 201 determines the source of the packets, which in this case is server 220. Node 220 then determines whether flooding disable has been set for this source, and in the embodiment of FIG. 6 it has (as is indicated in FIG. 6). The packets are therefore discarded and not flooded.

In and alternative embodiment, the packets in this scenario may be buffered instead of discarded, and a determination made at predetermined intervals of whether the intended destination has become associated with a known port. If so, of course, the packets may then be forwarded on that port. Also, if the flooding disable for the source associated with the packets is later removed (for example upon expiration of a timed duration), the buffered packets may be flooded at that time. In this alternate embodiment, it is preferred that the packets not be buffered indefinitely, but rather discarded, either after expiration of a certain time period or when the buffer has reached a certain capacity.

Figure 7:
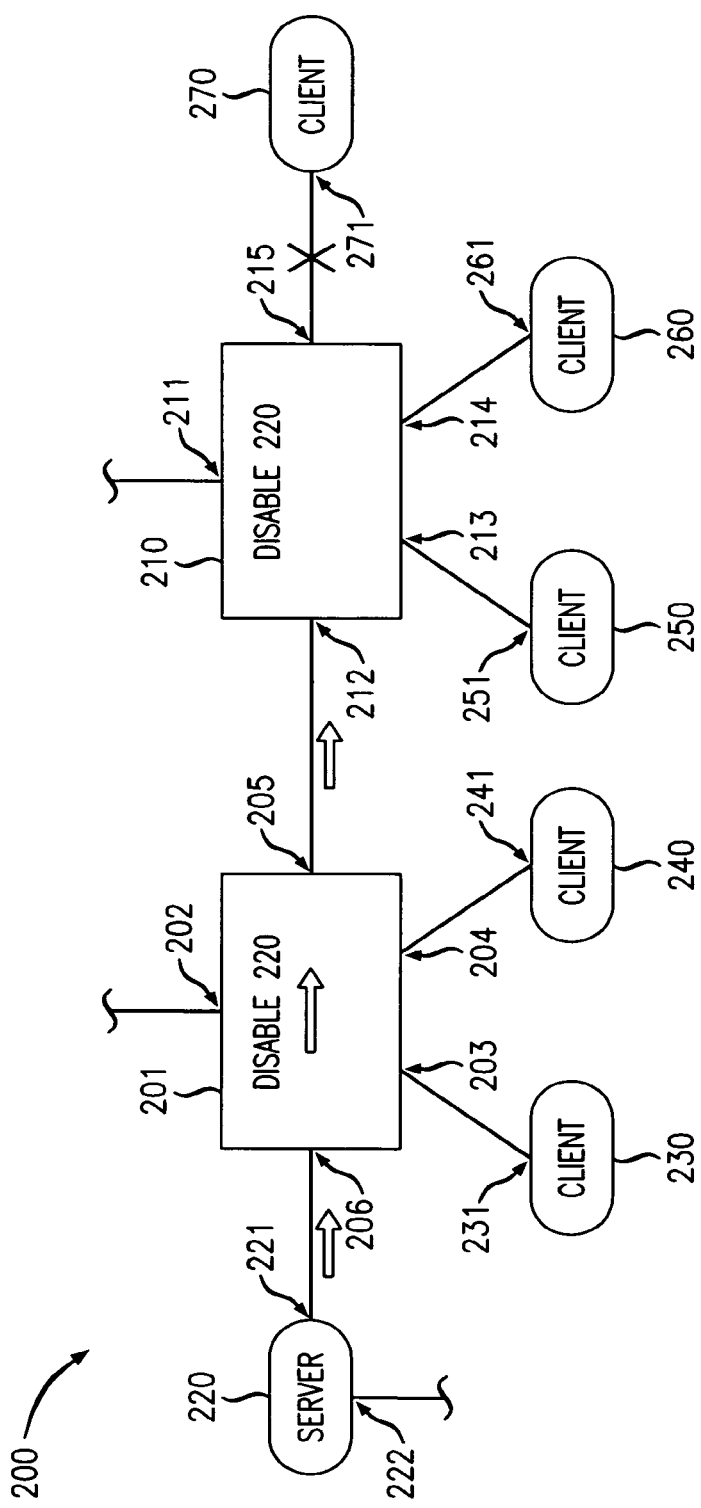
FIG. 7 illustrates a response to a different failure in the network of FIGS. 3 through 7 according to an embodiment of the present invention.

FIG. 7 illustrates a response to a different failure in network 200 according to an embodiment of the disclosure. In this embodiment, the need 210 is functioning normally, but a failure has occurred in the link between node 210 and client 270. Since the node 210 and the node 210 regularly communicate to confirm the connection between them, node 210 learns that client 270 should no longer be associated with port 215. In this scenario, packets received from server 220 at node 201 are examined and forwarded normally. Even though flooding disable has been associated with server 220, the node 201 associates client 270 with a known port, namely port 205. Here it is noted that the if the failure of node 210, as shown in FIG. 6, had occurred previously, in most networks some subsequent packet flow or other communication would have had to occur so that node 201 would once again associate client 270 with this port.

In the embodiment of FIG. 7, the packets received from server 220 are forwarded toward their intended destination on port 205 of node 201 and received at port 212 of node 210. In accordance with the disclosure, node 210 determines the intended destination of the received packets, and also determines whether that destination is associated with a specific port. In this embodiment, it will also determine the source of the packets and whether flooding is disabled for packets from that source. Since no port is currently associated with the destination and flooding is disabled for packets originating at server 220, the received packets are discarded (or, alternately, buffered as described above).

In the embodiment of FIGS. 3 through 7, the flooding disable was set in node 201 by the server 220, which indicated in a communication that packets originating at server 220 should not be flooded. The flooding disable in node 210 (see FIG. 7) may also have been set in this fashion, or may have been set by a network operator or other server. In this embodiment, the flooding disable setting remains until it is removed in a similar fashion. This is sometimes referred to herein as "static" flooding disable, and is most advantageously implemented in an environment where the port or ports associated with the server in various nodes does not change often, and after the nodes have learned the port associations. Flooding disable may also be implemented dynamically, as will now be described in reference to FIGS. 8 through 10.

Figure 8:
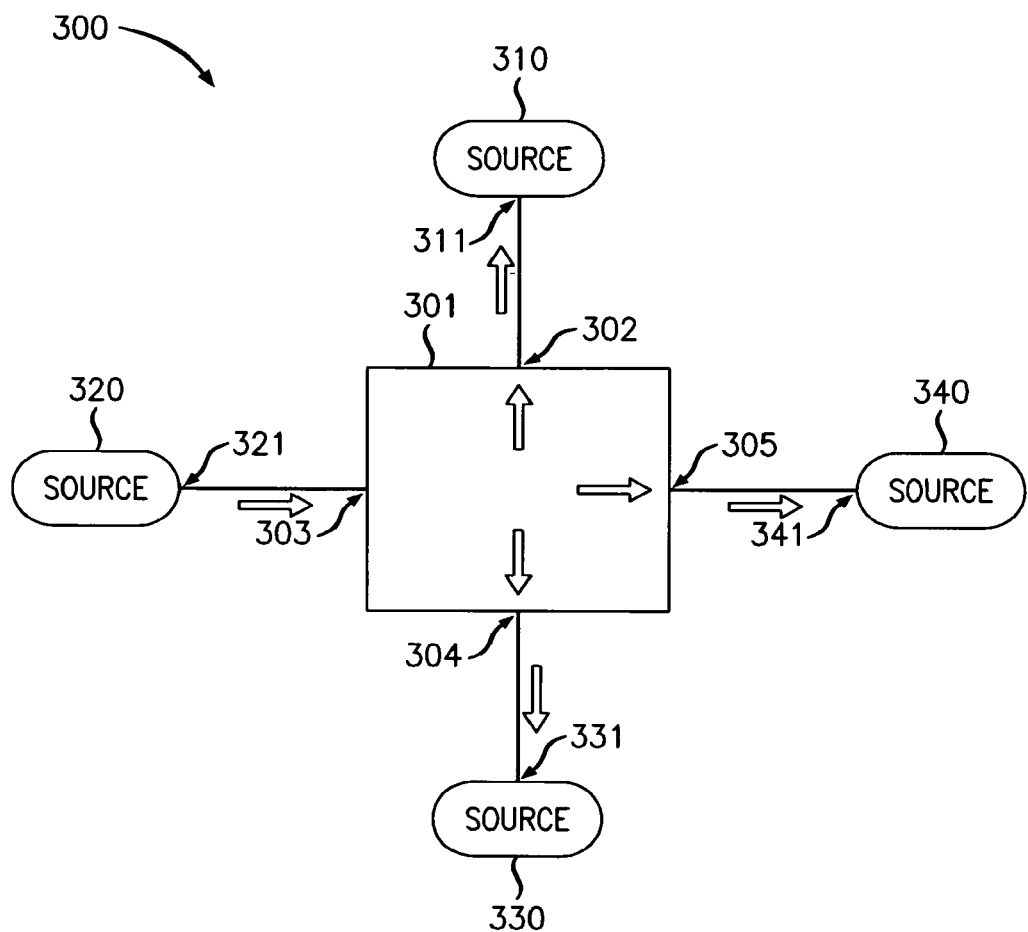
FIG. 8 is s simplified schematic diagram illustrating selected components of a network according to another embodiment of the present invention.

FIG. 8 is s simplified schematic diagram illustrating selected components of network 300 according to another embodiment of the disclosure. In this embodiment, network node 301 is in direct communication with four source nodes, 310, 320, 330, and 340, via respective ports 302, 303, 304, and 305. Although this is not illustrated as a client-server environment, note that each of the source nodes may perform a variety of functions, and no limitation on source functionality is intended by these illustrations. Note also that some or all of the sources may be connected to other devices as well as those shown; each is illustrated here with a single port for simplicity.

In the embodiment of FIG. 8, node 301 includes both a L2 hardware lookup table for storing port device associations and a timer, the operation of which devices will now be explained. When packets from port 321 of source 320 are received at port 303 of node 301, they are examined to determine their source and their intended destination. Here, it is assumed that node 301 has not previously associated source 320 with a particular port, so the association between port 303 and source 320 is now stored in the L2 hardware lookup table. It is also assumed that there is no port associated with source 340, so when source 340 is determined to be the intended destination of the packets, the packets are flooded on ports 302, 304, and 305. Sources 310 and 330, which receive the packets on ports 311 and 331, respectively, will determine that they are not the intended destination and simply discard the packets. The packets will also arrive at port 341 of source 340, their intended destination, where they will be received and processed according to their actual content.

Figure 9:
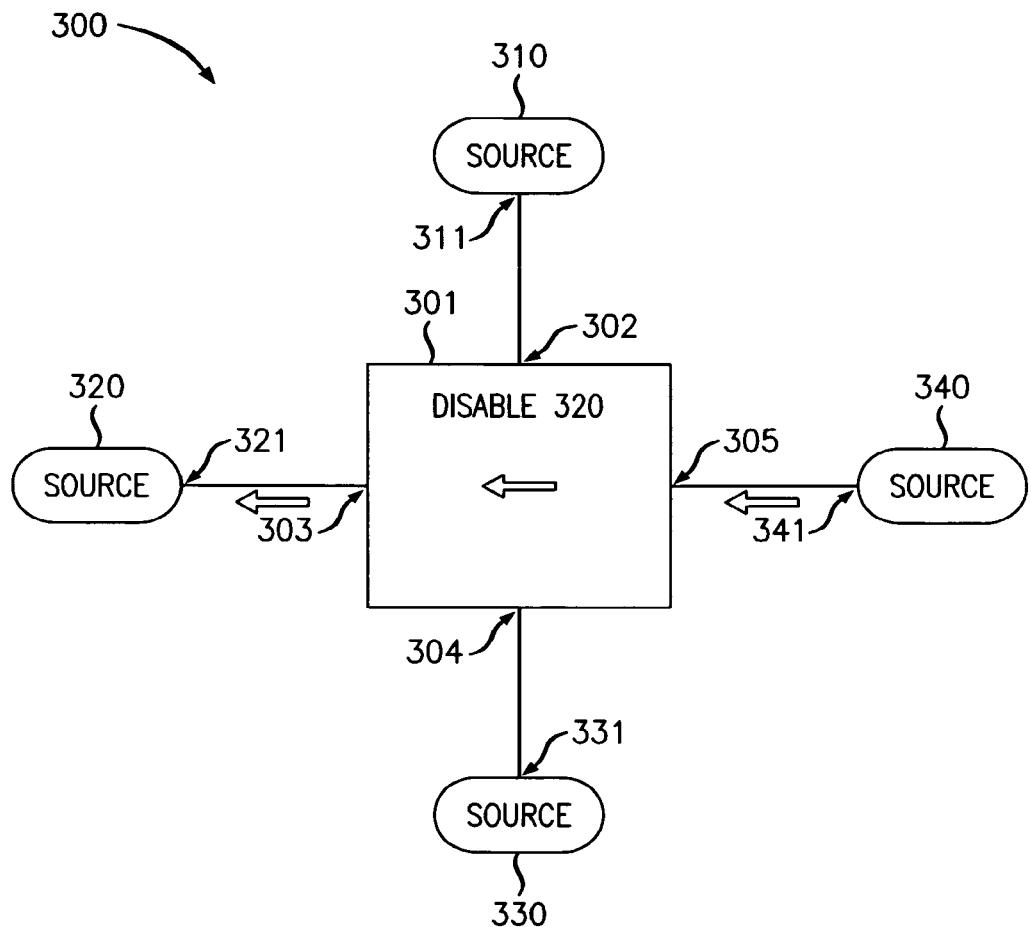
FIG. 9 shows the network of FIG. 8 and illustrates a response to the communication received at a source.

FIG. 9 shows the network 300 of FIG. 8 and illustrates a response to the communication received at source 340. When source 340 transmits a response to source 320, the packets it sends on port 341 are received at port 305 of node 301. When the packets are received in node 301, node 301 determines their source and their destination. If necessary, and in this embodiment it is presumed to be, an association between source 340 and port 305 is then recorded in the L2 hardware table for future reference. Since an association between port 303 and source 320 is already stored there, the packets are forwarded on port 303 of node 301 and received at port 321 of source 320. The packets received on port 305 are not flooded to all ports simply because the port associated with their destination is already known.

In accordance with this embodiment of the disclosure, when the packets are received in node 301 and forwarded to source 320, flooding is disabled for source 320. Again, this may be done by setting a disable flooding bit in a L2 hardware lookup table of node 301. Of course, since node 301 has now associated ports with both source 320 and source 340, no flooding will be necessary during a communication session between the two unless a change in the configuration of network 300 occurs.

Figure 10:
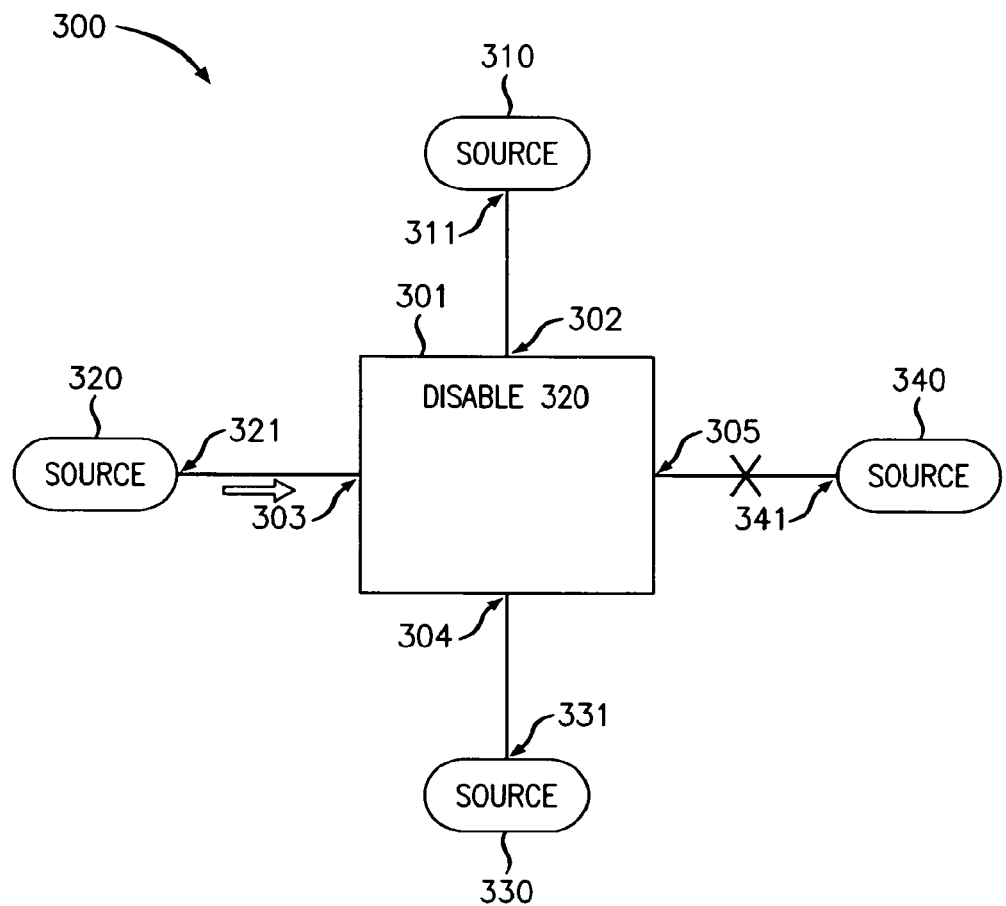
FIG. 10 shows the network of FIG. 8 and illustrates operation of the present invention after a failure in the link between a source and a node.

FIG. 10 shows the network 300 and illustrates operation of the present invention after a failure in the link between source 340 and node 301. Here, a failure has occurred, and node 301 has become aware that port 305 may no longer be associated with source 340. When packets arrive on port 303 from port 321 of source 320, node 301 examines the packets and determines their source and intended destination. Since source 340 no longer has a port associated with it, in normal operation the packets would be flooded on all ports. In this embodiment, however, node 301 determines that flooding has been disabled for packets from source 320. The packets then are simply discarded.

In accordance with this embodiment of the disclosure, when the packets are discarded, a timer is set for a predetermined duration. This duration may be determined by the network operator, for example, or indicated in one of the packet transmissions. When the timer duration expires, the flooding disable associated with packets from source 320 is removed, and further transmissions are treated in accordance with the illustration of FIG. 8 rather than FIG. 10. That is, to enable an attempt at continuing (or re-starting) the communication session between source 320 and source 240, flooding of packets from source 320 will again be permitted, at least for a limited time. In a preferred embodiment, source 320 will not send sensitive information to source 340 once it becomes aware that it is no longer receiving responses as expected. In this preferred embodiment it will, however, send regular communications that may be flooded on all port of node 301 until another response from source 340 causes flooding by node 301 to be disabled again for packets received from source 320.

Figure 11:
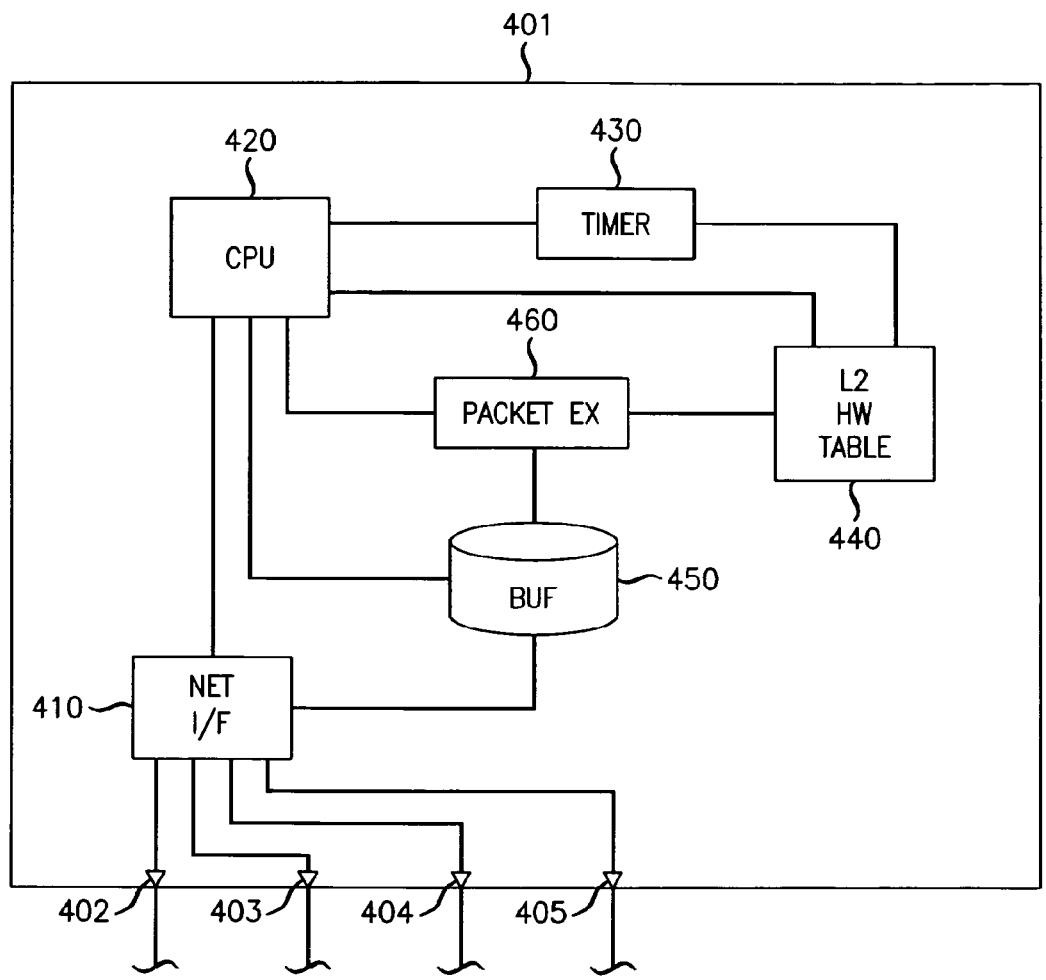
FIG. 11 is a simplified schematic diagram of a network node configured according to an embodiment of the present invention.

FIG. 11 is a simplified schematic diagram of a network node 401 configured according to an embodiment of the disclosure. In this embodiment, node 401 includes four ports, referred to as 402, 403, 404, and 405, although of course there could be more for fewer in other implementations. A network interface 410 receives input from each port and provides each port with packets for forwarding, as appropriate. In other implementations there may a number of such interfaces, for example a separate network interface associated with each port. Node 401 also includes a buffer 450 for temporarily storing received packets until they are examined by packet examiner 460 to determine at least their source and intended destination. For packets being discarded, of course, they may simply be deleted from buffer 450 at the direction of CPU 420. Otherwise, buffer 450 may hold the packets until they can be forwarded appropriately.

In the embodiment of FIG. 11, node 401 also includes a L2 hardware lookup table 440 for storing associations between the various ports of node 401 and external devices. In accordance with the disclosure, L2 hardware lookup table 440 also records whether flooding is disabled for packets from a particular source, in the event that no port is associated with the intended destination of the packets when they arrive, or at some later time if they are held temporarily in case such an association becomes known or the flooding disable is timed out for a given source. A timer 430 is also present for use in some, though not all embodiments. As described above in reference to FIGS. 8 through 10, in some cases a flooding disable setting may be associated with a duration after which it will be automatically unset or removed absent an intermediate re-setting. This dynamic setting is advantageously implemented in environments where a certain amount of packet flooding must be conducted to enable devices to locate others through the network.

Figure 12:
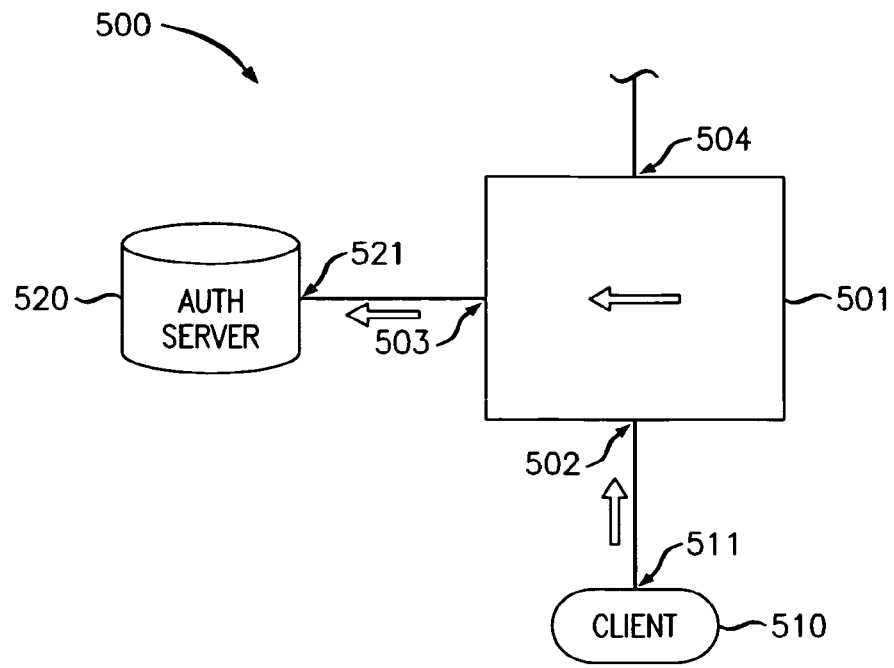
FIG. 12 is a simplified schematic diagram illustrating another network in accordance with another embodiment of the present invention.

FIG. 12 is a simplified schematic diagram illustrating a network 500 in accordance with another embodiment of the disclosure. As should be apparent, FIG. 12 represents a specific implementation, namely, a client (user) authentication process. In this embodiment, a client 510 is indirect communication with a network node 501 via the connection between port 511 of client 510 and port 502 of node 501. Network node 501 may be, for example, a switch or similar device. In this embodiment, an authentication server 520 is in direct communication with node 501 via a link between port 521 of authentication server 520 and port 503 of node 501. In this embodiment, it is presumed that node 501 associates the authentication server 520 with port 503. As a result, when packets are received on port 502 from client 510 and the packets are determined to have an intended destination of authentication server 520, they are simply forwarded on port 503, and not flooded to all other ports of node 501. There may be many such ports, of course, although in FIG. 12 there is shown only one additional port; port 504.

Figure 13:
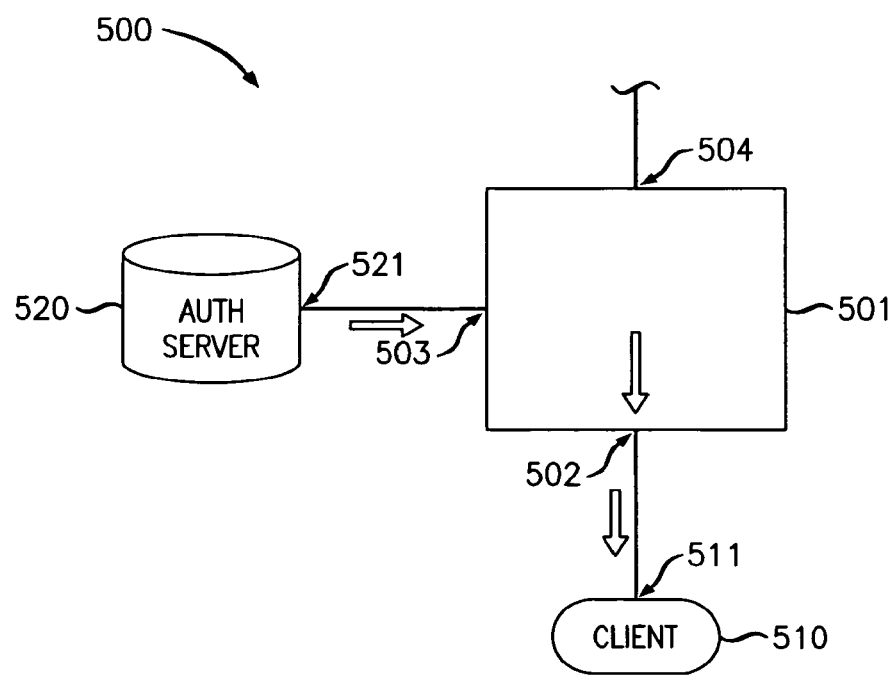
FIG. 13 illustrates a response from an authentication server to the authentication initiation of a client in the network of FIG. 12 in accordance with an embodiment of the present invention.

FIG. 13 illustrates a response from authentication server 520 to the authentication initiation of client 510 in network 500 in accordance with an embodiment of the disclosure. When authentication server 520 receives a request for authentication from client 510 via node 501, it responds either positively. In this embodiment, we assume that user associated with client 510 is properly authenticated and the response is positive. The positive response generated by authentication server 520 is sent as data packets on port 521, and is received at port 503 of node 501. Assuming no intervening event, node 501 has associated port 502 with client 510, and will therefore forward the packets from authentication server 520 on port 502. The packets are then received on port 511 of client 510, their intended destination. In accordance with the this embodiment of the disclosure, the communication from authentication server 520 also causes node 501 to disable flooding for packets received on port 502. As a consequence no packets received from client 510 will be flooded, even if their intended destination cannot be associated with a port of node 501. The flooding disable associated with client 510 will remain until removed, for example by another communication from authentication server 520 or after the expiration of a selected duration of time. Other means of removing the flooding disable are possible.

Figure 14:
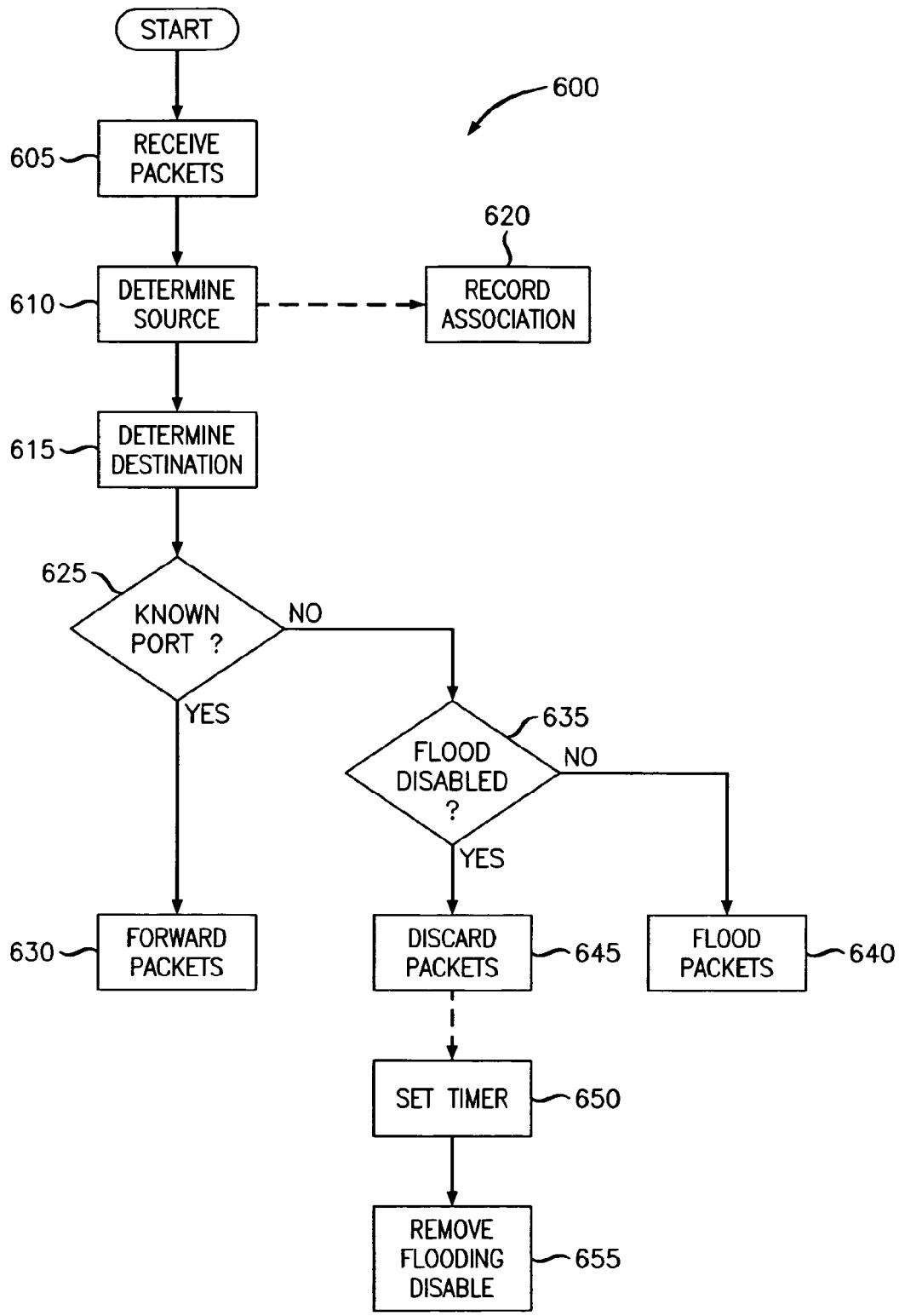
FIG. 14 is a flow diagram illustrating a method according to an embodiment of the present invention.

FIG. 14 is a flow diagram illustrating a method 600 according to an embodiment of the disclosure. At START it is presumed that the components necessary for performance of method 600 are present and properly configured (see, for example, FIGS. 3 through 13). The process then begins with receiving packets (or at least one packet) at a network node (step 605). The packets are then examined to determine their source (step 610) and intended destination (step 615). At this point, the port on which the packets arrived may be associated with the identified source, if necessary (step 620). In the embodiment of FIG. 14, a determination is also made as to whether the intended destination of the packets is associated with a port of the network node (step 625). This may be done, for example, by reference to an L2 hardware lookup table of the network node.

According to the embodiment of FIG. 14, if it is determined at step 625 that an association between a port of the node and the intended destination, then the packets may be forwarded on this known port (step 630). If there is no port of the network node associated with the intended destination, then it is determined whether flooding is disabled for packets associated with the identified source (step 635). This may be done, for example, by reference to a disable bit in an L2 hardware lookup table of the network node. If flooding for packets from the identified source device is not disabled, then the packets are flooded on all ports (except on the port at which they were received) (step 640). If flooding is disabled, however, then the packets are simply discarded (step 645).

In an alternate embodiment, when the packets are discarded at step 645, a flooding disable timer is set (step 650). The timer is usually set for a predetermined time period, although a variable or adjustable time period may be used as well, for example based on traffic flow or the number of times that packets associated with a particular source are discarded. In any event, upon expiration of the duration indicated by the timer, the flooding disable for that particular source is removed (step 655), so that flooding may occur. In some cases, the timer may also then be set (not shown) to a duration after which flooding disable will be reset.

As mentioned above, in an alternate embodiment (also not shown), instead of discarding the packets at step 645, the packets could be buffered for forwarding at such time as a port becomes associated with their intended destination or the flooding disable associated with their source is removed.

It should be noted that the method described above is intended to be exemplary rather than limiting, and the sequence shown is not strictly required. Rather the steps of the method 600 may be performed in any logically-consistent order. In addition, steps may be added to the process and, in some cases, removed without departing from the spirit of the invention.

In this manner, a method and apparatus is provided for controlling the flooding of packets in a packet-switched network, thereby reducing the security risk and making more effective use of network resources.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An authentication network, comprising:
   an authentication server configured to receive and respond to authentication requests;
   at least one network node configured to forward authentication requests from user devices to the authentication server; and
   a flooding disabler configured to selectively disable flooding of packets from authenticated user devices, whose authentication requests have been responded to positively by the authentication server, by causing the at least one network node to disable flooding of the packets from ports associated with the authenticated user devices irrespective of destinations of the packets.

2. The authentication network of claim 1, wherein the at least one network node is a switch.

3. The authentication network of claim 1, wherein the at least one at least one network node is a plurality of interconnected network nodes forming a communication path to the user devices.

4. The authentication network of claim 3, wherein each of the at least one network nodes comprises the flooding disabler for selectively disabling flooding of the packets from the authenticated user devices by its respective network node.

5. The authentication network of claim 1, wherein the flooding disabler may be set by a communication from the authentication server.

* * * * *